Aug. 6, 1940.　　　　　J. R. BATES　　　　　2,210,354
AIR CONDITIONER
Filed Nov. 10, 1937　　　　2 Sheets-Sheet 2

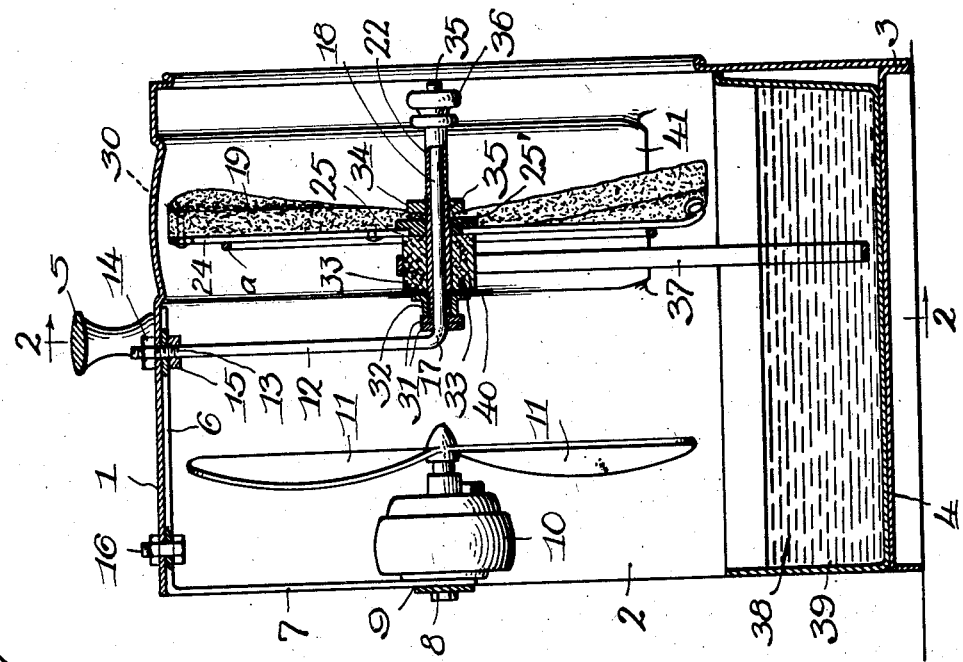

Inventor,
By John R. Bates,
Parkinson + Lane, Attys.

Witness:
Chas. R. Koursh.

Patented Aug. 6, 1940

2,210,354

UNITED STATES PATENT OFFICE 2,210,354

AIR CONDITIONER

John R. Bates, Chicago, Ill.

Application November 10, 1937, Serial No. 173,751

2 Claims. (Cl. 261—30)

This invention relates to a device for conditioning the air of a room, which device in its operation employs the two basic cooling principles of circulation and evaporation.

As is well known, whenever water or other liquid evaporates, such evaporation is always accompanied by an absorption of heat, to-wit, the heat of vaporization. If, therefore, a liquid evaporates and does not receive from without a quantity of heat equal to that which is expended in producing the vapor, its temperature is lowered and the cooling is greater in proportion as the evaporation is more rapid. The cold air produced by evaporation is used in hot climates to cool water in various ways, including the placing of the water in porous earthen vessels, through the pores of which the water percolates to keep the exterior of the vessel moist, and on which exterior there is a continual evaporation, which is accelerated when such vessel is placed in a current of air. For the same reason wine has been cooled by wrapping the bottles in wet cloths and placing them in a draft. In the present invention these basic cooling principles of circulation and evaporation are employed for the purpose of cooling as well as humidifying the air in a room or the like.

In the present invention I have provided in general a disc or wheel having angularly positioned blades or vanes which are mounted so as to rotate at a desired speed when directing thereagainst a circulation of air from an electric fan or the like. The revolving wheel or disc is formed of a material highly absorbent to water, and the angularity of the blades or vanes may be changed as desired to produce a greater or less speed of rotation by the air forced thereagainst from the electric fan or the like. I have found as an ideal material for this revolving absorber, cellulose sponge, which absorbs twenty times its weight in water and possesses high capillary attraction for water.

By arranging the device so that when the water is fed or otherwise brought into contact with the absorber blades and other parts, the rotating absorber will carry a considerable amount of water in its pores, which water is evaporated when the currents of air are directed thereagainst from the electric fan. This evaporation of the water causes a cooling of the air in the room in which the device is operated, as well as also causing an addition of moisture to the air in the room. It is thus seen that my novel device provides an economical and efficient apparatus for cooling the air in a room in the summer, and for adding moisture thereto in the winter, as well as filtering and cleansing the air in the room in both winter and summer.

Among the objects of my invention are to produce such a device as referred to above, and utilize the advantages stated for conditioning the air in a room in both winter and summer.

A further object is to provide such an air conditioning device in which the absorber wheel and attachments can be readily and easily removed for cleaning purposes.

A still further object is to make possible such an air conditioning device that, in addition to being efficient and portable, can be sold at such a price as to be within the reach of all, as well as being easy and economical of operation and maintenance.

Other objects, advantages and capabilities inherent in my improved device will later become more readily apparent.

My invention further resides in the combination, construction and arrangement of parts illustrated in the accompanying drawings, in which I have shown a preferred embodiment, but which I wish it understood that the same is susceptible of modification and change without departing from the spirit of my invention.

In the drawings:

Fig. 1 is a vertical longitudinal section through an air conditioner embodying my invention, parts being shown in elevation for the sake of convenience.

Fig. 2 is a vertical transverse section taken on the line 2—2 of Fig. 1 and looking in the direction of the arrows.

Fig. 3 is a fragmentary detail view showing the manner of mounting the electric fan within the casing.

Figure 7:
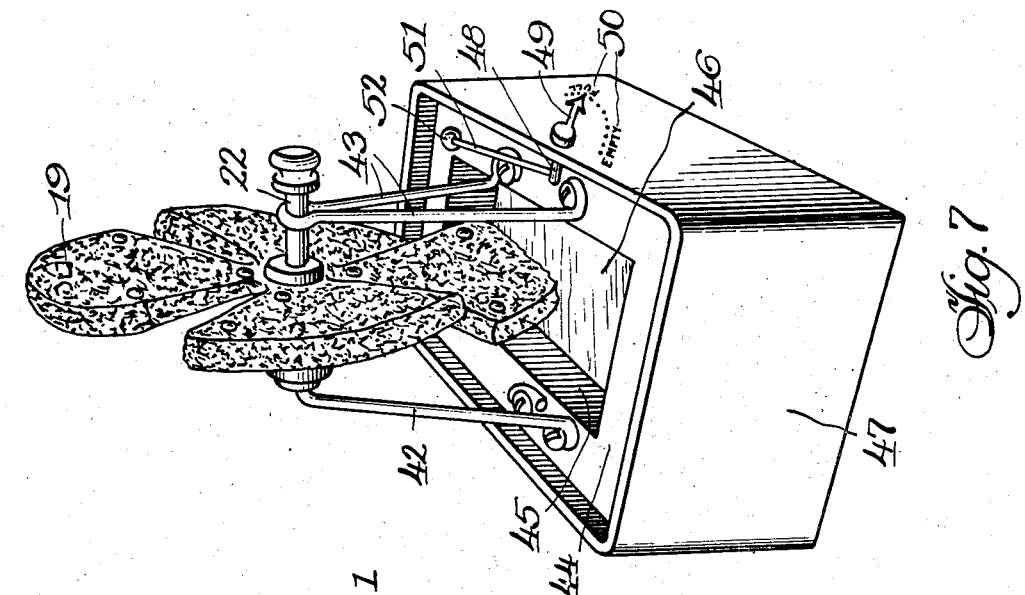
Fig. 7 is a perspective view of a modification showing a different mounting for the absorber wheel and method of applying water thereto.
Figure 5:
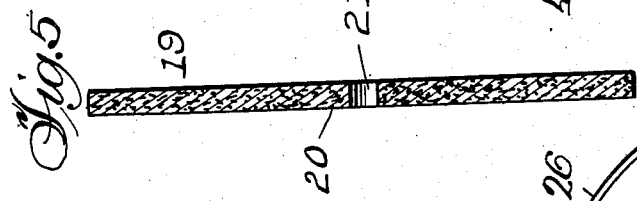
Fig. 5 is a section taken on the line 5—5 of Fig. 4 and showing the absorber wheel before its blades are bent into angular position.

Describing my device in detail and referring to Figs. 1 and 2, there is provided a casing 1 of semi-cylindrical formation at the top and having downwardly extending side walls 2, being provided at the lower ends with supporting feet 3 and a bottom 4. This casing is preferably made of metal, although other suitable materials may be used without departing from the spirit of my invention.

Casing 1 is provided at its top with a suitable handle 5, which may be used for transporting the device from place to place in the room. Extending longitudinally and centrally along the inner face of the top of casing 1, is a bar 6 which at the rear end of the casing is bent downwardly to form the depending portion 7, which at its lower end is secured by bolts or the like 8 to the lateral cross-bar 9, which at its opposite ends is fastened in any desirable manner to the sides of the casing 1. Bolts 8 also perform the function of supporting fixedly in position within the casing 1 the electric fan 10, having suitable connections with a wall plug or the like, and carrying at its forward end blades 11, which may be of any number, size and design to force a blast of air toward the front of the device of any desirable strength. It will, of course, be understood that the electric fan may be of any usual and economical type, with the customary accessories including starting and stopping switch, extension cord, wall plug, and the like. In other words, this fan may be purchased on the market and be of any desirable size and speed.

Depending from the central top portion of casing 1 is a rod 12 formed at its upper end with screw threads 13 and extending through aligned openings in the bar 6 and top of casing 1. After being passed through said aligned openings said rod 12 is fixed in position, as shown, by suitable nuts 14 and 15 to firmly and fixedly hold said rod depending from the top of the casing. As will also be noticed, nuts 14 and 15 will together with the bolt 16 firmly fix the bar 6 in position along the central inner face of casing 1. Rod 12 at its lower end is bent at 17 to provide a forwardly extending horizontal portion 18, upon which is rotatably mounted the absorber wheel 19, which together with its associated parts will now be described.

The absorber wheel will preferably be of circular form of desired thickness, the thickness being somewhat substantial in order to give a greater absorbing capacity. This absorber wheel comprises a hub portion 20, in which is formed aperture 21 of a size to snugly pass over the elongated tubular member 22. The absorber wheel is made from cellulose sponge material, and the disc or blank from which this wheel is made is formed with radial slits 23 which extend from the circumference to a distance sufficiently removed from aperture 21 to leave enough material to form a hub portion, which together with the reinforcing wires later described will afford sufficient rigidity to hold the absorber blades in rigid position. After being provided with the slits 23 the absorber wheel 19 will have fastened thereto the wire framework 24 shown in Figs. 1, 2 and 6.

Figure 6:
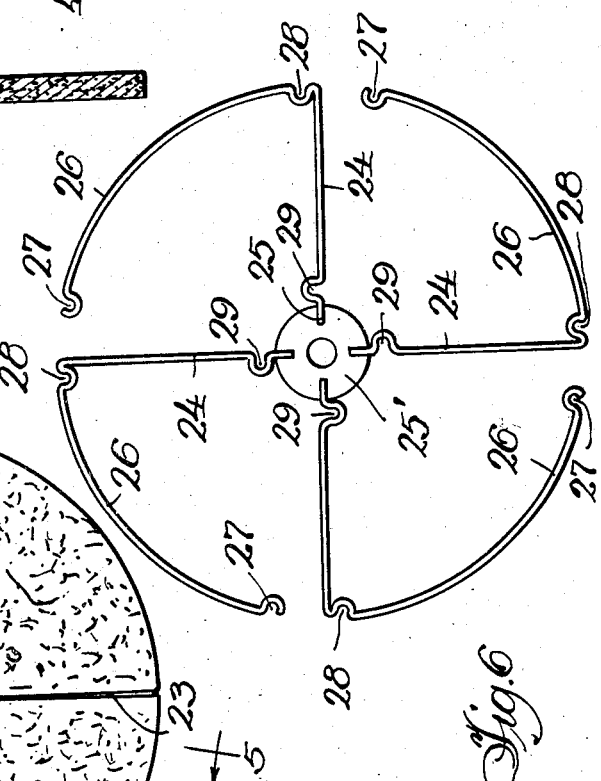
Fig. 6 is a front elevation of a wire framework used to give added rigidity to the absorber wheel shown in Fig. 4.
Figure 4:
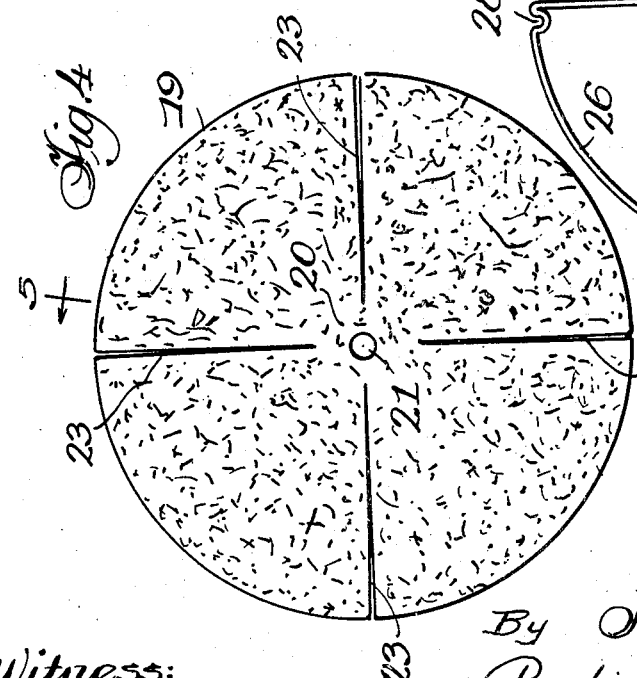
Fig. 4 is a front elevation of an absorber disc, showing the blades which may be bent to any angular position.

The inner ends 25 of the radial portions of wire frame 24 are inserted into suitable openings or grooves in a metal hub plate 25' mounted upon sleeve 22, in which openings or grooves said ends 25 may be welded or otherwise secured as desired. Each of the radial members 24 has formed at its outer ends the arcuate member 26, which latter terminates a short distance from the next adjacent radial portion 24 and has formed in its free end the eyelet 27. This eyelet may be complete or left partly open at one side as occasion may make desirable. Arcuate members 26 also have formed adjacent their connection with radial members 24, the partial eyelets or loops 28 as shown in Fig. 6. Radial portions 24 will also be formed with a partial eyelet or loop 29 at a point adjacent the hub of the absorber wheel. In assembling the wire frame 24 and the absorber wheel 19, the former will either have suitable grooves to receive this wire frame formed in one face, or, if desired, due to the soft spongy nature of the material of the absorber wheel, this wire frame may be pressed into one face of the same, or merely applied against said face, and secured thereto by bolts, rivets or the like 30, which pass through the various eyelets, partial eyelets, loops or the like, 27, 28 and 29, and the ends of said bolts, rivets, or the like, may have nuts applied thereto or be riveted over at their ends (in case rivets are used), or otherwise suitably secured to hold the wire frame 24 firmly against or within the absorber wheel to give it the necessary strength and rigidity, as seen in Fig. 1. If desired, a strengthening ring a may be welded or otherwise secured to the radial members 24 as seen in Figs. 1 and 2.

This combination of cellulose sponge material and wire frame enables material on one side of each of the slits 23 to be bent angularly to the desired degree to form blades of the propeller or fan type, as will be better understood from an inspection of the modification in Fig. 7, in which modification the absorber wheel is similarly formed. With these blade portions of the absorber wheel 19 pressed outwardly to the desired degree, it being here understood that the wire frame is also capable of a similar bending, it will be seen that a blade of the propeller type is formed such that when air is driven against it by an electric fan or other suitable source of air current, the absorber wheel will be caused to rotate much in the same manner as a windmill.

At the rear end of the tubular sleeve 22 are positioned one or more washers 31, against which the sleeve 22 abuts to limit the endwise movement of the latter. A suitable spacing sleeve 32 may, if desired, be positioned between the hub portion 33 and the washers 31 to hold the absorber wheel in its proper position longitudinally on sleeve 22. A nut 34 may be threaded onto threads 35 formed on sleeve 22 to hold the absorber wheel 19, wheel or hub 33, and associated parts, in proper relative position on sleeve 22. The free end of rod 18 will be formed with screw threads 35, upon which will be threaded a nut, knob or the like 36, which may after being threaded into place a suitable distance be held against turning movement by any suitable lock nut or other means, so as to give sleeve 22 sufficient freedom for rotation but not too much endwise lost motion.

The hub portion or wheel 33 being of the same type of absorbent material as the absorber wheel 19 will, when water is fed or applied thereto, soak up the same and transmit it to the blades of absorber wheel 19. In the form shown in Figs. 1 and 2, in order to carry water to this hub or wheel 33, I have loosely mounted thereon a belt or the like 37, of any suitable material, to carry water 38 upwardly to hub or wheel 33 from the water pan 39, which at the beginning will be substantially filled with water. As will be clear from the drawings, rotation of the absorber wheel 19 and hub or wheel 33 will cause movement of belt 37 and thus carry water upwardly to these parts.

In the operation of my device, when the electric current is connected to the electric fan 10, the blades 11 of this fan will rotate rapidly and drive a current of air against the adjacent face of the absorber wheel 19. If desired, absorber wheel 19 may be started in rotation by giving a turning movement to the knob or nut 36, but whether or not it is given such starting impetus the current of air from the electric fan blades 11 will cause absorber wheel 19 to rotate, resulting in belt 37 carrying water upwardly from water pan 39 to thoroughly saturate the hub or wheel 33 and also the blades of absorber wheel 19, thoroughly wetting all of these parts. The continued passage of air currents from fan blades 11 through the blades of the absorber wheel 19, will cause evaporation of the water contained in the absorber wheel. This evaporation of the water from the blades of absorber wheel 19 will absorb heat from the surrounding air, which heat is needed as the heat of vaporization in this evaporating action. This absorption of heat from the surrounding air results in lowering the temperature of the room in which this device is being operated. There is also simultaneously produced a humidifying action by the carrying of moisture from absorber wheel 19 into the room by the air currents from propeller wheel 11.

In order to prevent the belt 37 from running off of the hub or wheel 33, I may provide a disc member having the outwardly extending circumferential flange 40 on the side of wheel 33 away from the absorber wheel 19 or, if desired, a suitable circumferential groove may be formed in wheel 33, in which the belt 37 will run during rotation of the absorber wheel and hub wheel 33. Also, as seen in Fig. 2, the sides of the casing are provided with an inwardly extending portion or water shed 41 on each side of the casing to shed any excess water that may not be evaporated or passed into the air of the room back to the water pan 39. As will be understood, such excess water will be thrown by centrifugal force against the inside of that portion of casing 1 opposite the absorber wheel 19 and will trickle down the inside of the casing and be shed by the protruding portions 41 back to the water pan. This downwardly trickling water will also be acted upon by the currents of air from the electric fan causing further evaporation and cooling of the casing and the air in the room.

In the modification shown in Fig. 7, the absorber wheel 19 is similarly mounted as in Figs. 1 and 2, except to omit the hub or wheel portion 33 and belt 37, and instead of having the upwardly extending supporting rod 12, as in Fig. 1, the device will be supported by bending the rod 18 at its end downwardly and outwardly at an angle to form the leg 42, and there will also be provided at the opposite end of sleeve 22, the legs 43, supporting sleeve 22 at their closed upper ends. The bottom ends of legs 42 and 43 will be suitably secured by screws, bolts, or the like, to a float member 44, which may be formed of wood, cork, or other suitable buoyant material.

In this form shown in Fig. 7, instead of using the belt 37, the ends of the absorber wheel blades will pass through an opening 45 in float 44 and dip into the water 46 contained in the water pan 47, the proportion of parts being such as to permit the ends of these blades of the absorber wheel 19 to extend a suitable distance into the water to enable them to absorb water and carry the same upwardly to be evaporated by the air currents from an electric fan that will be positioned closely adjacent said absorber wheel after the general manner shown in Fig. 1, either inside of a case or without such casing as desired. The use of such casing is preferred as it acts to prevent excess water from being thrown from the ends of the blades of the absorber wheel out into the room, but conducting such water back to the water pan as explained above in connection with Figs. 1 and 2. In the form shown in Fig. 7, an indicator is provided to indicate the height of water in the pan, which indicator comprises the shaft 48 rotatably mounted in one of the side walls of the water pan 47, and carrying upon the outside thereof the indicator arm 49, which points to the corresponding indicia 50 because of rotation of shaft 48 by arm 51, which is pivotally mounted in any suitable manner at 52 to float 44 which, as it rises or descends will cause movement of the indicator arm 49.

While I do not wish to be limited thereto, the cellulose sponge material of which my absorber wheel is formed, will absorb twenty times its weight in water. The numerous large and small pores and cells in this material, due to its spongy structure, is ideal for an extensive surface area for producing a rapid moisture and air mixture when the absorber wheel is being rotated by the air from the electric fan. This absorbing and air mixture action will be many times what it would be if ordinary materials were used in constructing the absorber wheel. As one illustration and in connection with which I have found good results, although I do not wish to be limited thereto, the electric fan may be rotated at twenty-four hundred revolutions per minute, the air from which will cause the absorber wheel to rotate at approximately six hundred revolutions per minute, as a result of which the suspended water belt will bring up water to wet the absorber wheel and produce very desirable results within a short time. As is understood, the absorber wheel will start and stop with the electric fan as it is rotated directly from the blast of air from said fan. As is obvious, other speeds of revolution may be used as desired and in accordance with the design of the machine and results to be accomplished. Also, preferably, the cellulose blades of the absorber wheel will be inclined at an angle of thirty degrees with the plane of the wheel proper toward the front of the cabinet to permit a quick contact and deflection of the air flow through the cabinet. Other angles of these blades, of course, may be used as desired and in accordance with the design of the machine.

It is also pointed out that after the machine has been used long enough to cause the absorber wheel to become dirty from dirt in the air, the absorber wheel may be removed by unscrewing the knob or nut 36 and pulling the absorber wheel and its associated parts, including the sleeve 22, off of the rod 18, whereby these parts may be thoroughly washed with soap and water or other cleansing material, after which the absorber wheel and associated parts may be replaced for further use.

In addition to lowering the temperature of the air in a room, as well as humidifying the same, my device also purifies the air that passes through the same by washing it and picking up in the absorber wheel much of the dust and dirt in the air. The importance of my wire frame 24 is also to be noted, as this wire will not only hold the cellulose absorber wheel blades with sufficient rigidity but will also permit them to be bent at the desired angularity to cause rotation of the absorber wheel by the air from the electric fan, and thus permit regulating the speed of the absorber wheel by varying the angle of inclination of the blades. In other words, for summer cooling purposes it may be desirable to have the absorber wheel rotate at a greater speed and in the winter at a slower speed for humidifying purposes. The breeze from the electric fan combined with the breaking up of this breeze by the rapidly revolving cellulose fan blades of the absorber wheel, brings about the chilling of the water in the water supply pan and the air in the room. This cooling of the water in the supply pan is further accelerated by the agitation of this water by the revolving belt which carries the water up to the absorber wheel, thus rendering the water more susceptible to the cooling breeze from the fan.

It is thus seen that I have provided a simple, efficient device that can be manufactured and sold for a low price for providing hygienic air conditions in small or large office or living rooms. It is also portable and may be operated at any place where the electric fan can be plugged into a wall or plug or other suitable source of electricity.

While I have described my absorber wheel as being preferably made of cellulose sponge material, I do not wish to be limited to this particular material, but wish it understood that any material of suitable absorbing capacity and general structure may be used without departing from the spirit of my invention, the main requirement being that the absorber wheel will absorb a sufficient amount of water and have sufficient cellular structure and porosity to so present this absorbed water to the current of air from the electric fan as to produce the conditions desired and referred to above in the room in which the device is being operated.

The front of the casing of my air conditioner may either be entirely open or provided with a grille work of any desired formation. The same is also true of the back of the casing.

Having now described my invention, I claim:

1. In an air conditioner an absorbing wheel adapted to be rotated by the air from an adjacent fan, said wheel having angular blades made of a highly porous material, a water reservoir, a float in said reservoir, supports on said float for rotatably supporting said wheel, the float having an opening therein, the blades of said wheel passing through said opening and dipping in the water in said reservoir as said wheel is rotated.

2. In an air conditioning device, a casing, a power driven fan mounted in said casing, an absorbing wheel rotatably mounted in front of the fan and adapted to be rotated by the air from the fan, said wheel including a plurality of wire frames and a slitted disk of porous cellulose sponge material removably attached thereto, a belt of porous material associated with the hub of said disk, and a water reservoir in said casing into which said belt depends to supply water to said disk.

JOHN R. BATES.